United States Patent
Simon et al.

(10) Patent No.: US 7,359,773 B2
(45) Date of Patent: Apr. 15, 2008

(54) WIRELESS RELAY FOR PAYMENT ENFORCEMENT DEVICES AND METHOD OF USING SAME

(75) Inventors: Michael P. Simon, Hemet, CA (US); Franklin C. Simon, Hollywood, FL (US)

(73) Assignee: Payment Protection Systems, Inc., Murrieta, CA (US)

( * ) Notice: Subject to any disclaimer, the term of this patent is extended or adjusted under 35 U.S.C. 154(b) by 0 days.

(21) Appl. No.: 10/887,024

(22) Filed: Jul. 8, 2004

(65) Prior Publication Data

US 2005/0033483 A1 Feb. 10, 2005

Related U.S. Application Data

(60) Provisional application No. 60/485,391, filed on Jul. 9, 2003.

(51) Int. Cl.
- *B60R 25/11* (2006.01)
- *B60Q 1/00* (2006.01)
- *G06F 19/00* (2006.01)

(52) U.S. Cl. .............. 701/29; 701/2; 701/35; 701/214; 340/5.3; 340/426.16; 307/1.03; 705/13

(58) Field of Classification Search .......... 701/29, 701/2, 35, 200, 214; 340/5.2, 5.3, 5.31, 5.41, 340/426.13, 426.15, 426.16, 416.26, 825.36, 340/825.72; 307/10.1, 10.2, 10.3, 10.6; 705/13, 705/77
See application file for complete search history.

(56) References Cited

U.S. PATENT DOCUMENTS

| | | | | |
|---|---|---|---|---|
| 5,513,244 A | * | 4/1996 | Joao et al. ........... 455/404.1 |
| 5,986,543 A | * | 11/1999 | Johnson ............... 340/426.19 |
| 6,195,648 B1 | | 2/2001 | Simon et al. |
| 6,489,897 B2 | | 12/2002 | Simon |
| 6,639,511 B2 | * | 10/2003 | Haruna et al. ........ 340/426.13 |
| 6,653,946 B1 | * | 11/2003 | Hassett ................. 340/928 |
| 6,664,888 B1 | * | 12/2003 | Bishop ................. 340/426.11 |
| 6,717,527 B2 | | 4/2004 | Simon |
| 6,731,195 B2 | * | 5/2004 | Nemoto ................ 340/5.2 |
| 6,828,692 B2 | | 12/2004 | Simon |
| 6,870,467 B2 | | 3/2005 | Simon |
| 2002/0128769 A1 | * | 9/2002 | Der Ghazarian et al. ... 701/207 |
| 2005/0134438 A1 | | 6/2005 | Simon |

OTHER PUBLICATIONS

International Search Report mailed Oct. 5, 2005.

* cited by examiner

*Primary Examiner*—Tan Q. Nguyen
(74) *Attorney, Agent, or Firm*—E. Joseph Gress

(57) ABSTRACT

A vehicle disablement device disables a vehicle if it a payment has not been received prior to a payment due deadline. The vehicle can also be disabled if it is determined that the vehicle disablement device is being tampered with. Disablement of the vehicle occurs by transmission of a wireless signal from a vehicle disablement device to a relay in a power control panel. The disablement can also occur by transmission of a second wireless signal from a tamper disabler (or a tamper receiver) to a relay in the power control panel. The critical system of the vehicle that can be disabled by the vehicle disablement device can be the same or a different critical system as that which can be disabled by the tamper disabler (or a tamper receiver).

17 Claims, 4 Drawing Sheets

WIRELESS RELAY FOR PAYMENT ENFORCEMENT DEVICES AND METHOD OF USING SAME

RELATED APPLICATIONS

This application claims the benefit of U.S. Provisional Patent Application No. 60/485,391, titled "WIRELESS RELAY FOR PAYMENT ENFORCEMENT DEVICES" and filed on Jul. 9, 2003, the entire disclosure of which is incorporated here by reference.

BACKGROUND

The present invention is related to systems and methods for disabling equipment in response to the failure of a user to perform a specific task. More particularly, the present invention is related to systems and methods for preventing tampering with systems which disable a vehicle in response to the failure of a user to enter a code that corresponds with a stored code in the vehicle.

Typically, monthly payments to utility companies are made with very high reliability. This is partly due to the threat of service cut-off. For example, failure to pay a telephone bill will result in loss of telephone services. Thus, telephone bills are paid regularly because failure to do so has immediate and tangible results. Monthly payments on an automobile loan, for example, are not likely to be paid as regularly. Although an automobile may be repossessed, the process can be expensive and complex. Thus, the threat of repossession is less immediate than utility service cut-off. To encourage reliable loan re-payments, it is desirable to have a "service" cut-off for equipment subject to the loan, such as an automobile.

Conventional systems to encourage reliable loan re-payments interrupt the ignition system of an automobile on a regular, timed interval. To re-enable the automobile, a user is required to return to a payment center, make a payment, and have an agent reset the interrupt mechanism for a renewed timed interval. Typically, such a system can only be reset by an authorized agent, as the task can require a key held in escrow at the payment center. While such a system can be effective in encouraging users to repay their loans in a timely fashion, it can have significant overhead considerations. For example, the system can require a user to travel to the payment center each payment period of the loan to re-enable the automobile. In addition, a user can be required to arrive at the payment center during customer service hours, which may not be convenient. Still further, a user may have to wait to receive the attention of an available agent at the payment center.

Solutions to these problems are described in commonly assigned U.S. Pat. No. 6,195,648, entitled "Loan Repay Enforcement System" issued on Feb. 27, 2001 and commonly assigned U.S. patent application Ser. No. 10/804,299, entitled "Time Based Disablement of Equipment" filed on Mar. 19, 2004, both of which are incorporated in their entirety here by reference. This patent and application describe systems and methods for the disabling of equipment if a payment is not timely made. Specifically, a control module associated with the equipment stores a plurality of codes. To prevent disablement of the equipment, a code that corresponds to one of the stored plurality of codes must be entered prior to the expiration of a payment period. To receive a code, timely payment must be received and logged in a payment center.

If a vehicle disablement device is tampered with or removed, it may be possible to continue to operate the vehicle without having made a proper payment. If it is possible to operate the vehicle without having made a proper payment, the intention of the vehicle disablement device has been overcome. Two systems for detecting tampering with a vehicle disablement device are disclosed in commonly assigned U.S. patent application Ser. No. 09/954,004, entitled "Tampering Detector and System Disabler" filed Sep. 18, 2001, and commonly assigned U.S. patent application Ser. No. 10/151,037, entitled "Tampering Detector and System Disabler" filed May 21, 2002, the entire contents of both of these applications is herein expressly incorporated by reference.

SUMMARY

Accordingly, a wireless relay for payment enforcement devices and method of using same are described. According to an exemplary embodiment, a system includes a vehicle disablement device including a wireless transmitter. The vehicle disablement device is configured to disable the critical system of the vehicle if a payment is not made on the vehicle prior to a payment due date. A disablement of the critical system prevents operation of the vehicle by transmitting a wireless disablement signal to a relay in a power control panel. The relay disables power to the critical system in response to the wireless disablement signal.

According to another exemplary embodiment, a method includes periodically sending a signal from a tamper transmitter to a tamper receiver. A determination is made whether the vehicle is being tampered with. The periodic sending of the signal is inhibited if it is determined that the vehicle is being tampered with. The vehicle is disabled if the periodic sending of the signal is inhibited. The vehicle is disabled by sending a wireless signal from the tamper receiver to a relay in a power control panel of the vehicle. The relay inhibits power to a critical system of the vehicle.

According to another exemplary embodiment, a system for disabling a vehicle having a critical system includes a vehicle disablement device including a wireless transmitter, the vehicle disablement device configured to disable the critical system of the vehicle if a payment is not made on the vehicle prior to a payment due date. A tamper transmitter is configured to periodically transmit a tamper signal. A tamper receiver is configured to disable the critical system when the tamper signal is not received from the tamper transmitter for a predetermined period of time. A disablement of the critical system prevents operation of the vehicle by transmitting a first wireless disablement signal to a relay in a power control panel. The tamper receiver disables the critical system by transmitting a second wireless disablement signal to the relay in the power control panel. The relay disables power to the critical system in response to either the first or second wireless disablement signal.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computer system. For example, it will be recognized that in each of the embodiments, the various actions can be performed by specialized circuits or circuitry (e.g., discrete and/or integrated logic gates interconnected to perform a specialized function), by program instructions being executed by one or more processors, or by a combination of both.

Figure 1:
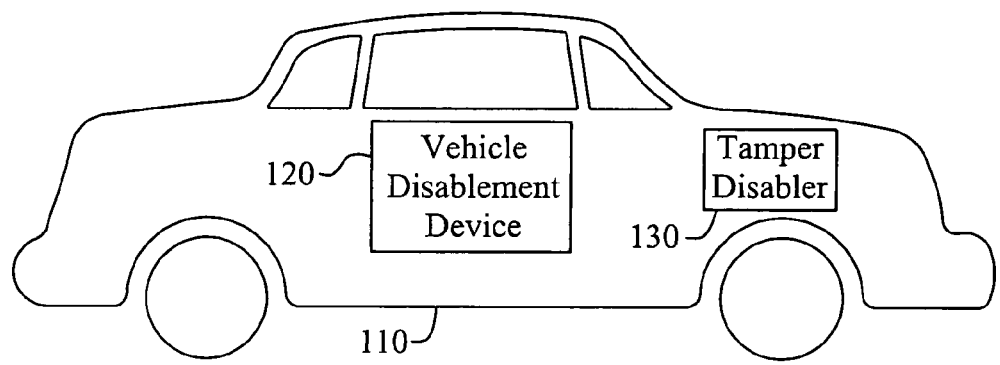
FIG. 1 illustrates a vehicle with a vehicle disablement device and a tamper disabler device in accordance with one exemplary embodiment of the present invention.

FIG. 1 illustrates a vehicle with a vehicle disablement device and a tamper disabler device in accordance with exemplary embodiments of the present invention. As illustrated in FIG. 1, a vehicle 110 is equipped with a vehicle disablement device 120 and a tamper disabler 130. In accordance with exemplary embodiments of the present invention, when it is detected that the vehicle disablement device 120 has been tampered with, a wireless signal is sent from the vehicle disablement device 120 to the tamper disabler 130. The wireless signal can be a radio frequency signal, an infrared signal, or any other known type of wireless signal.

By sending a wireless signal from the vehicle disablement device 120 to the tamper disabler 130, the tamper disabler 130 can be located in any portion of vehicle 110. Further, since there are no wires connecting the vehicle disablement device 120 and the tamper disabler 130, it can be difficult for a person who is attempting to tamper with the vehicle disablement device 120 from discovering the existence, much less the location, of the tamper disabler 130. Alternatively, the vehicle disablement device 120 and the tamper disabler 130 can be connected by a "hard-wired" connection.

Figure 2:
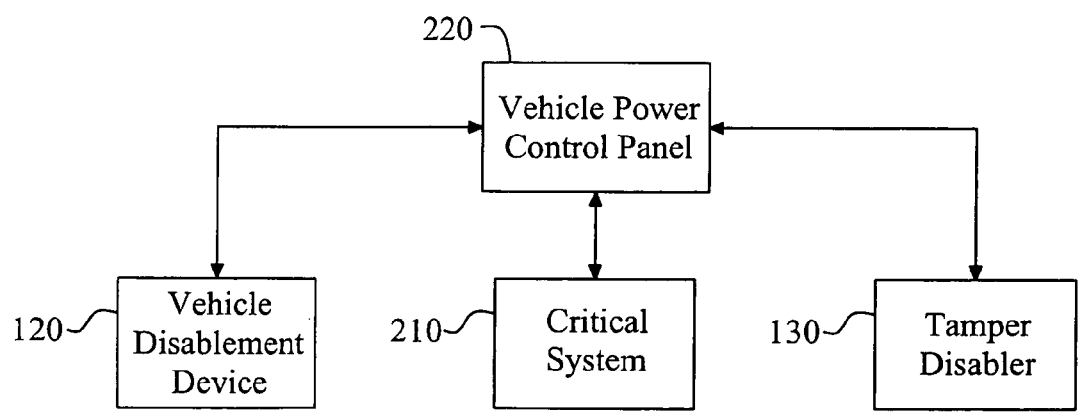
FIG. 2 illustrates the relationship between a vehicle disablement device, a critical system and a tamper disabler in accordance with one exemplary embodiment of the present invention.

FIG. 2 illustrates the relationship between the vehicle disablement device 120, a critical system 210 of a vehicle, and the tamper disabler 130. As illustrated in FIG. 2, both the vehicle disablement device 120 and the tamper disabler 130 are connected to a vehicle power control panel 220. The vehicle power control panel 220 is connected to the critical system 210 of a vehicle to supply power to the critical system 210. Accordingly, if the vehicle disablement device 120 is tampered with such that the device can no longer disable the critical system 210, the tamper disabler 130, upon receipt of a signal from the vehicle disablement device 120, can still disable the critical system 210 of a vehicle, providing redundancy in the arrangement.

In accordance with exemplary embodiments of the present invention, the vehicle disablement device 120 and/or the tamper disabler 130 are connected to the vehicle control panel 220 by wireless communication links. The vehicle control panel 220 contains fuses and/or relays for providing power to various critical systems of the vehicle. For example, the vehicle power control panel 220 can contain a starter relay, a fuel pump relay, an ignition system relay, and the like. The vehicle power control panel 220 can be located either under the hood of the vehicle or inside of the vehicle, depending upon the particular design of the vehicle. The relays and/or fuses in vehicle power control panel 220 are conventional components found in most modern vehicles.

In accordance with exemplary embodiments of the present invention, the conventional relays and/or fuses are replaced with special relays and/or fuses that include a wireless receiver, and possibly a wireless transmitter. Accordingly, if the vehicle disablement device 120 determines that the critical system 210 of the vehicle should be disabled, the vehicle disablement device 120 will transmit a wireless signal to the vehicle power control panel 220, and more specifically, to a particular wireless receiver-enabled relay in the vehicle power control panel 220. Similarly, if the tamper disabler 130 detects a tampering with the vehicle disablement device 120, the tamper disabler can send a wireless signal to a wireless receiver of a relay inside of the vehicle power control panel 220.

Although not illustrated in FIG. 2, the vehicle power control panel 220 is connected between a power source, for example a vehicle battery, and the critical system 210. Accordingly, upon receipt of a disablement signal from the vehicle disablement device 120 or the tamper disabler 130, the special relay in the vehicle power control panel 220 will shut off the power to the particular system 210 for which the relay supplies power. By including wireless communication links between the vehicle disablement 120 and the vehicle power control panel 220, and/or between the tamper disabler 130 and the vehicle power control panel 220, it can be difficult for persons to determine how to defeat the disablement of the critical system 210. The difficulty arises because there can be no wires connecting the vehicle disablement device 120, the tamper disabler 130, and the special relay in the vehicle power control panel 220.

Moreover, installation of the vehicle disablement device 120 and the tamper disabler 130 can be simplified, since installing wires to the critical system 210 for installation of the relay of the vehicle disablement device 120 and the tamper disabler 130 can be avoided. Instead, the conventional relay for the critical system 210 in the power control panel 220 can be replaced by a special wireless-enabled relay. Additionally, since the vehicle disablement device 120 and/or the tamper disabler 130 need not include a relay for disabling the critical system 210, and because the devices can transmit wireless signals to a relay located in the power control panel 220, the devices can be battery powered.

Since the vehicle disablement device 120 may be powered by the vehicle, removing the vehicle disablement device 120 from the vehicle, e.g., by cutting the wires connecting the vehicle disablement device to the vehicle, the vehicle disablement device may no longer have power to send the signal to tamper disabler 130. In accordance with exemplary embodiments of the present invention, the vehicle disablement device can be provided with a backup power source such as those described in U.S. patent application Ser. No. 09/954,004.

Figures 3, 4:
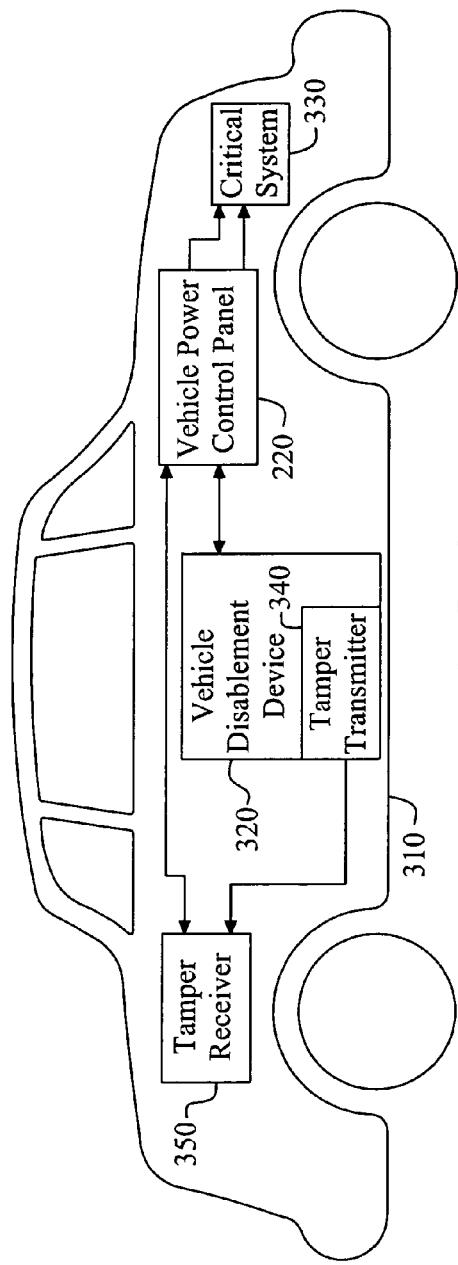
FIG. 3 illustrates a illustrates a vehicle with a vehicle disablement device and tamper disabler device in accordance with another exemplary embodiment of the present invention.
FIG. 4 illustrates an exemplary vehicle power control panel in accordance with the present invention.

FIG. 3 illustrates a vehicle with a vehicle disablement device and a tamper disablement system in accordance with another exemplary embodiment of the present invention. The tamper disablement system operates by continuously transmitting a signal, and by employing the lack of receipt of the signal as a trigger to disable the vehicle. As illustrated in FIG. 3, a vehicle 310 includes a vehicle power control panel 220, a vehicle disablement device 320, a critical system 330, a tamper transmitter 340, and a tamper receiver 350. The tamper transmitter 340 can either be a component of the vehicle disablement device 320, or the transmitter 340 can be a component separate from the vehicle disablement device 320, but with an interface for communicating with the vehicle power control panel 220.

As illustrated in FIG. 3, the vehicle disablement device 320 and the tamper receiver 350 are connected to a critical system 330 of the vehicle 310 through the vehicle power control panel 220. Similar to the description above in connection with FIG. 2, the tamper receiver 350 and the vehicle disablement device 320 are connected to the vehicle power control panel 220 by wireless communication links. Critical system 330 can be any type of system, the disablement of which can prevent operation of the vehicle, including, but not limited to, the starter circuit, the ignition circuit, or the fuel pump.

Moreover, although FIG. 3 illustrates the vehicle power control panel 220 being connected to a single critical system 330, the vehicle power control panel 220 can be connected to a number of critical systems of the vehicle. Accordingly, the tamper receiver 350 and the vehicle disablement device 320 can send wireless signals to the same relay of the vehicle power control panel 220 to disable the same critical system 330, or the tamper receiver 350 and vehicle disablement device 320 can send wireless signals to different relays of the vehicle power control panel 220 to disable different critical systems 330 of the vehicle. For example, the vehicle disablement device 320 may disable the starter circuit while the tamper receiver 350 may disable the fuel pump.

In operation, the tamper transmitter 340 will continuously transmit a signal, which is referred to here as an "all clear" signal, to the tamper receiver 320. In accordance with one embodiment of the present invention, the all clear signal can be transmitted for approximately 600 milliseconds every two seconds, but other periods and durations of the signal are possible. If the tamper transmitter 340 detects that the vehicle disablement device 320 is being tampered with, the tamper transmitter 340 ceases the transmission of the all clear signal. When the tamper receiver 350 determines that it has not received the all clear signal for a predetermined amount of time, e.g., 20 seconds, the tamper receiver 350 will disable a critical system 330. By employing the wireless relay in the power control panel 220, installation of the tamper receiver 350 is simplified, since it is not necessary to install wires to the critical system and to install a relay for the tamper receiver 350. Instead, the conventional relay in the power control panel 220 can be replaced by a special wireless-capable relay. Additionally, since the relay is remotely controlled using a wireless communication link by the tamper receiver 350 and/or the vehicle disablement device 320, the tamper receiver 350 and the vehicle disablement device 320 can be battery-powered, i.e., they do not have to be powered from the vehicle itself.

FIG. 4 illustrates a vehicle power control panel in accordance with exemplary embodiments of the present invention. As illustrated in FIG. 4, a vehicle power control panel 400 can contain a number of standard vehicle control circuits, and a wireless controlled vehicle control circuit 410. The wireless controlled vehicle control circuit 410 will receive a signal from either tamper receiver 350 or vehicle disablement device 320, and in response to receipt of the signal, can disconnect the power to the particular critical system 330 of the vehicle for which the wireless controlled vehicle control circuit 410 is responsible for supplying power.

Figure 5:
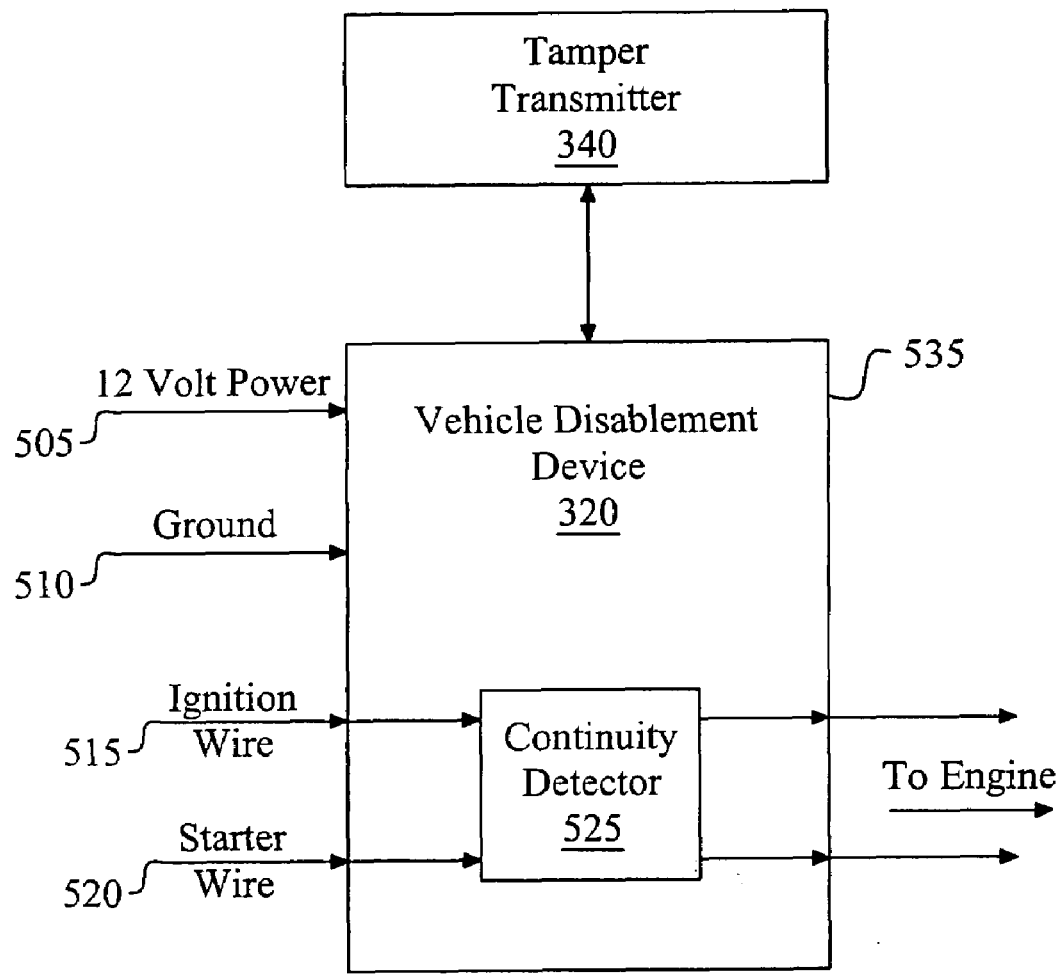
FIG. 5 illustrates an exemplary vehicle disablement device and tamper transmitter in accordance with the present invention.

FIG. 5 illustrates mechanisms for detecting tampering. As illustrated in FIG. 5, the vehicle disablement device 320 receives power from the vehicle's 12 volt power supply wire 505 and the vehicle ground wire 510. In addition, an ignition wire 515, connected from the vehicle's ignition (not shown), passes through a continuity detector 525, in the vehicle disablement device, and out of the vehicle disablement device 320 to the vehicle's engine (not shown). Similarly, a starter wire 520 passes through the continuity detector 525 in the vehicle disablement device 320 and continues to the engine (not shown). The vehicle disablement device 320 communicates with tamper transmitter 340 using a bi-directional communication line 535.

The continuity detector 525 is illustrated as a separate component within the vehicle disablement device 320 for ease of illustration. However, it should be recognized that the continuity detector 525 can be either a discrete component within the vehicle disablement device 320 or can be incorporated as a function to be performed by a microprocessor (not shown) included in the vehicle disablement device 320. If the continuity detector 525 functionality is performed by the microprocessor, this functionality will be contained in software code and/or discrete logic functions, either within the microprocessor itself or as a separate components of the vehicle disablement device 320.

Now that a more detailed description of the vehicle disablement device has been provided, a description of techniques for detecting tampering will be described. First, suppose that either the vehicle's 12 volt power wire 505 or the ground wire 510 are cut. A tampering can be detected by the tamper transmitter 340. Specifically, the tamper transmitter 340 will recognize that the power to the vehicle disablement device 320 has been cut, and therefore, the tamper transmitter 340 will stop sending the all clear signal to the tamper receiver 350. If either the 12 volt power wire 505 or the ground wire 510 are cut, the tamper transmitter 340 will stop sending the all clear signal regardless of whether a payment due deadline has passed without an associated code being entered into the vehicle disablement device 320.

If the continuity detector 525 determines that the ignition wire 515 has been cut and that the starter has been energized, the vehicle disablement device will indicate to the tamper transmitter 340 that a tampering has been detected. It will be recognized that if the ignition wire is cut and the starter is energized, the starter has likely been energized by jumping the vehicle, for example, by rolling the vehicle down a hill while entering the vehicle into gear. If the ignition wire has been cut and the starter has been energized, the tamper transmitter 340 will stop sending the all clear signal regardless of whether a payment due deadline has passed.

If the continuity detector 525 determines that the starter wires have been cut and if a payment due deadline has passed and a code associated with the payment due deadline has not been entered into the vehicle disablement device 320, then the vehicle disablement device 320 will inform the tamper transmitter 340 that a tampering has been detected. The tamper transmitter 340 will then stop sending the all clear signal. In addition, if it is determined that the starter has been energized by jumping the vehicle and if a payment due deadline has passed and a code associated with the payment due deadline has not been entered into the vehicle disablement device 320, the tamper transmitter 340 will stop sending the all clear signal. Also, although not technically a tamper condition, if a payment due deadline has passed and a code associated with the payment due deadline has not been entered into the vehicle disablement device 320, and if the ignition circuit is energized, the tamper transmitter 340 will inhibit sending the all clear signal.

In accordance with exemplary embodiments of the present invention, since there is a wireless communication link between the vehicle disablement device 320 and the vehicle power control panel 220, the continuity detector 525 need not be present. However, to further discourage potential tampering with the wireless communication links, the continuity detector 525 can be present in the vehicle disablement device 320. With such an arrangement, the ignition wire 515 and the starter wire 520 entering the continuity detector 525 can be designed to appear to be the same as the ignition wire and starter wires of the vehicles, while in fact, the wires need only be connected to a voltage source for the purposes of the continuity detector 525 detecting a tampering with the vehicle disablement device 320. Accordingly, in this embodiment, the continuity detector 525 would not be connected to the engine, but can contain wires which appear to be ignition and starter wires and appear to be connected to the engine. By including the false ignition and starter wires, upon the cutting of these wires, the vehicle disablement device 320 or the tamper transmitter 340 (using the tamper receiver 350) can send the wireless signal to the vehicle power control panel 220 to disable the vehicle.

The wireless communication link between the vehicle disablement device 320, tamper transmitter 340 and/or a tamper receiver 350, and the vehicle power control panel 220 can be any type of wireless communication link including radio frequency links. These wireless communication links can employ any type of modulation, any type of frequency band, and any type of air interface protocols. However, to avoid inadvertent disablement of another vehicle within radio range of the vehicle disablement device 320, the tamper transmitter 340, or the tamper receiver 350, a unique identifier can be associated with the relay containing the wireless receiver in the vehicle power control panel 220. Accordingly, the disablement signal sent from the vehicle disablement device 320, the tamper transmitter 340, or the tamper receiver 350 can include this unique identifier to better ensure that the relay of the correct vehicle is disabled. This can avoid disabling a relay of a vehicle that may be closely located to the vehicle to be disabled. This unique identifier can either be preprogrammed into the relay at the manufacturer of the relay, or can be programmed upon installation of the relay in the vehicle.

Figure 6:
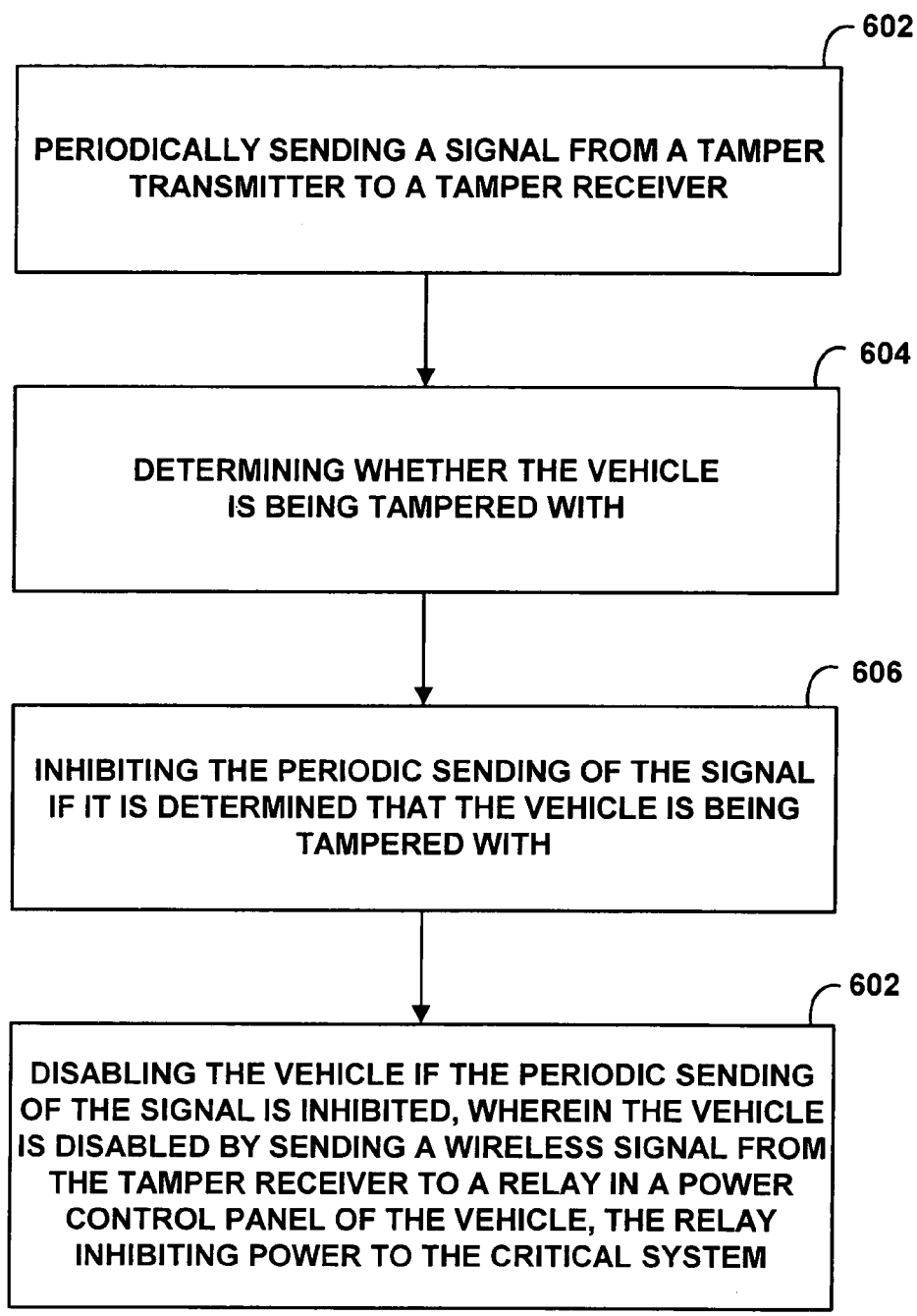
FIG. 6 depicts a flowchart illustrating an exemplary method for disabling a vehicle.

FIG. 6 depicts a flowchart illustrating a method for payment enforcement using wireless devices and communication links. In block 602, a signal is periodically sent from a tamper transmitter to a tamper receiver. For example, the tamper transmitter 340 shown in FIG. 3 can be used to send the all clear signal to the tamper receiver 350 at periodic intervals. Next, in block 604, a determination is made whether the vehicle is being tampered with. As discussed above, the tamper transmitter 340 can determine whether the 12 volt power supply has been tampered with by detecting a loss of power. In addition, the tamper transmitter 340 can utilize other detection devices, such as the continuity detector 525 discussed above, to determine whether other critical signals/systems of the vehicle associated with the payment enforcement system, such as the starter and ignition signals, have been tampered with.

In block 606, the periodic sending of the signal is inhibited if it is determined that the vehicle is being tampered with. For example, when it is determined that the vehicle is being tampered with, the tamper transmitter 340 can inhibit its periodic sending of the all clear signal to the tamper receiver 350. Next, in block 608, the vehicle is disable if the periodic sending of the signal is inhibited. The vehicle is disabled by sending a wireless signal from the tamper receiver to a relay in a power control panel of the vehicle, the relay inhibiting power to a critical system of the vehicle. As described above, when the tamper receiver 350 does not receive the all clear signal from the tamper transmitter 340 for a predetermined amount of time, e.g., two seconds, the tamper receiver 350 sends a signal to a wireless-controlled relay 410 in the vehicle power control panel 220. The wireless-controlled relay 410 can be configured to supply power to the critical system 330. The wireless-controlled relay 410 inhibits power to the critical system 330 when the signal is received from the tamper receiver 350, thus disabling the vehicle.

According to an exemplary embodiment, a code is input into a time-based equipment disablement device. The time based disablement device can compare the code received from the user with codes stored in the device's memory. When the user's code matches a code stored in the device memory, an indication of the entry of a matching code can be stored in the time-based disablement device. The stored indication can be used to allowing the user to operate the equipment associated with the time-based disablement device until the date and/or time associated with another code which has not been entered has occurred.

In addition, the method can include determining whether a date and/or time has occurred, and if the date and/or time has occurred, determining whether a code associated with the date and/or time has been input into the time-based equipment disablement device. If the code has not been previously entered, the equipment can be disable. If the code has been previously entered, the user can be allowed to operate the equipment.

According to another exemplary embodiment, each of a plurality of lights, e.g., light emitting diodes, can be illuminated in a sequence to indicate when the end of a payment period is upcoming. For example, the illumination of a green light can indicate that no payment is due, a yellow light can be illuminated to indicate that a payment is due shortly, and a red light can be illuminated to indicate that a payment is due immediately and that the equipment will imminently be disabled. The method can also include pulsing the lights at a frequency that increases as a payment due deadline draws nearer. In addition to the use of lights to indicate whether a payment is upcoming or due, an audible beep or other sound can be used to indicate such. For example, a single beep can be used to indicate that a payment is upcoming and a constant beep can indicate that a payment is passed due.

Although exemplary embodiments of the present invention have been described in connection with particular types of vehicle disablement devices, it will be recognized that the present invention is equally applicable to any type of vehicle disablement devices. Further, although exemplary embodiments of the present invention have been described in connection with a vehicle disablement device, it will be recognized that the present invention is equally applicable to any type of disablement device. Additionally, although exemplary embodiments of the present invention were described in connection with loan payments, the present invention is equally applicable to any other type of financing arrangements including leases and the like. Moreover, although it has been described that the vehicle disablement device detects the tampering and sends a signal to the tamper disabler, another device can be used to perform the detecting and sending. In addition, the tamper disabler can perform the detecting, thereby obviating the sending step.

Although the present invention has been described in considerable detail with clear and concise language and with reference to certain exemplary embodiments thereof including the best mode anticipated by the inventors, other versions are possible. Therefore, the spirit and scope of the invention should not be limited by the description of the exemplary embodiments contained therein.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A system for disabling a vehicle, the vehicle including a critical system, the system comprising:
   a vehicle disablement device including a wireless transmitter, the vehicle disablement device configured to disable the critical system of the vehicle if a payment is not made on the vehicle prior to a payment due date;
   a tamper transmitter configured to periodically transmit a tamper signal; and
   a tamper receiver configured to disable the critical system when the tamper signal is not received from the tamper transmitter for a predetermined period of time;
   wherein a disablement of the critical system prevents operation of the vehicle by transmitting a first wireless disablement signal to a relay in a power control panel, and the tamper receiver disables the critical system by transmitting a second wireless disablement signal to the relay in the power control panel, the relay disabling power to the critical system in response to either the first or second wireless disablement signal.

2. The system of claim 1, wherein at least one of the group of signals consisting of the wireless disablement signals and the tamper signal includes an identifier associated with the relay, and the relay is responsive only to signals including the identifier.

3. The system of claim 1, wherein the tamper transmitter is configured to inhibit transmission of the tamper signal when a tampering with the vehicle is detected.

4. The system of claim 3, wherein the tamper transmitter is configured to detect the tampering with the vehicle.

5. The system of claim 4, wherein the tampering with the vehicle detected by the tamper transmitter is associated with a tampering with the vehicle disablement device.

6. The system of claim 1, comprising:
   circuitry configured to detect a tampering with the critical system of the vehicle and configured to communicate the detected tempering with the critical system to the tamper transmitter.

7. The system of claim 6, wherein the circuitry is configured to detect a tampering with at least one of a starter system and an ignition system of the vehicle.

8. The system of claim 1, wherein the critical system disabled by the vehicle disablement device and the critical system disabled by the tamper receiver are different critical systems of the vehicle.

9. The system of claim 8, wherein the critical system disabled by the vehicle disablement device is a starter circuit of the vehicle and the critical system disabled by the tamper receiver is a fuel pump of the vehicle.

10. The system of claim 1, wherein the vehicle disablement device is adapted to be located on the vehicle.

11. A method for disabling a vehicle comprising:
    periodically sending a signal from a tamper transmitter to a tamper receiver;
    determining whether the vehicle is being tampered with;
    inhibiting the periodic sending of the signal if it is determined that the vehicle is being tampered with;
    disabling the vehicle if the periodic sending of the signal is inhibited, wherein the vehicle is disabled by sending a wireless signal from the tamper receiver to a relay in a power control panel of the vehicle, the relay inhibiting power to a critical system of the vehicle;
    determining whether a code has been entered into a vehicle disablement device prior to a payment due date; and
    disabling, by the vehicle disablement device, the critical system of the vehicle if the code has not been entered prior to the payment due date by sending a wireless signal to a relay in the power control panel.

12. The method of claim 11, wherein the tamper transmitter determines whether the vehicle is being tampered with.

13. The method of claim 11, wherein circuitry coupled to tamper transmitter and configured to detect a tampering with the critical system of the vehicle determines whether the vehicle is being tampered with.

14. The method of claim 11, wherein the disabling comprises:
    determining, by the tamper receiver, whether a predetermined amount of time has passed since a last periodic signal from the tamper transmitter has been received; and
    disabling, by the tamper receiver, the critical system of the vehicle if it is determined that the predetermined amount of time has passed since the last periodic signal has been received.

15. The method of claim 11, wherein the disabling comprises:
    inhibiting power to at least one of a fuel system, a starter system, and an ignition system of the vehicle.

16. The method of claim 11, comprising:
    including an identifier associated with the relay in the wireless signal sent from the tamper receiver;
    wherein the relay only inhibits power to the critical system if the wireless signal includes the identifier.

17. The method of claim 11, wherein the critical system disabled by tamper receiver and the critical system disabled by the vehicle disablement device are different systems.

* * * * *